(No Model.) 9 Sheets—Sheet 1.

J. W. GRISWOLD & A. G. GOLDTHWAIT.
MACHINE FOR MAKING WIRE FENCING.

No. 604,041. Patented May 17, 1898.

WITNESSES:
INVENTORS
John Moe Griswold
Abel G. Goldthwait
BY
Paul Benjamin
their ATTORNEY.

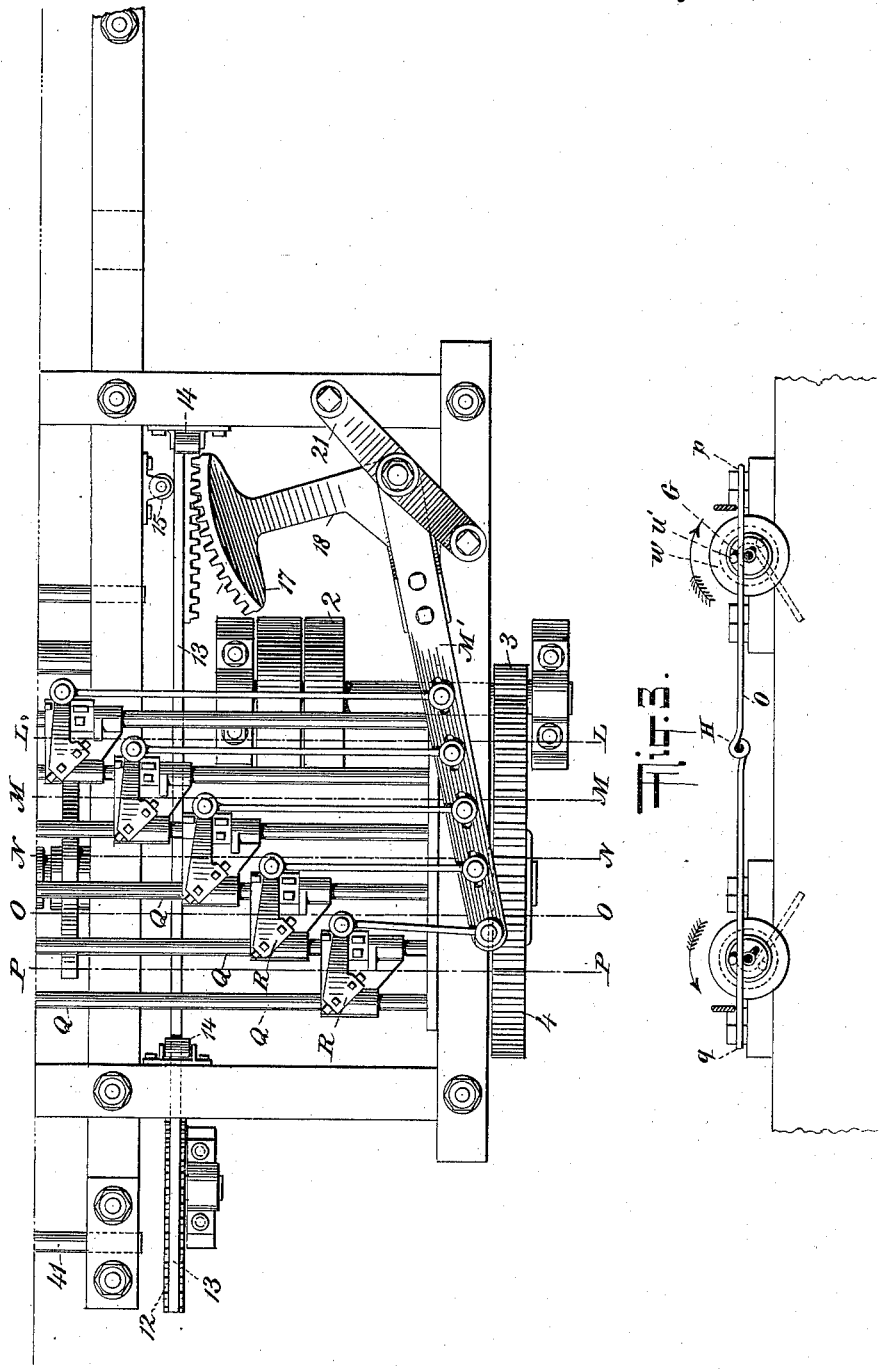

(No Model.) 9 Sheets—Sheet 3.
J. W. GRISWOLD & A. G. GOLDTHWAIT.
MACHINE FOR MAKING WIRE FENCING.
No. 604,041. Patented May 17, 1898.
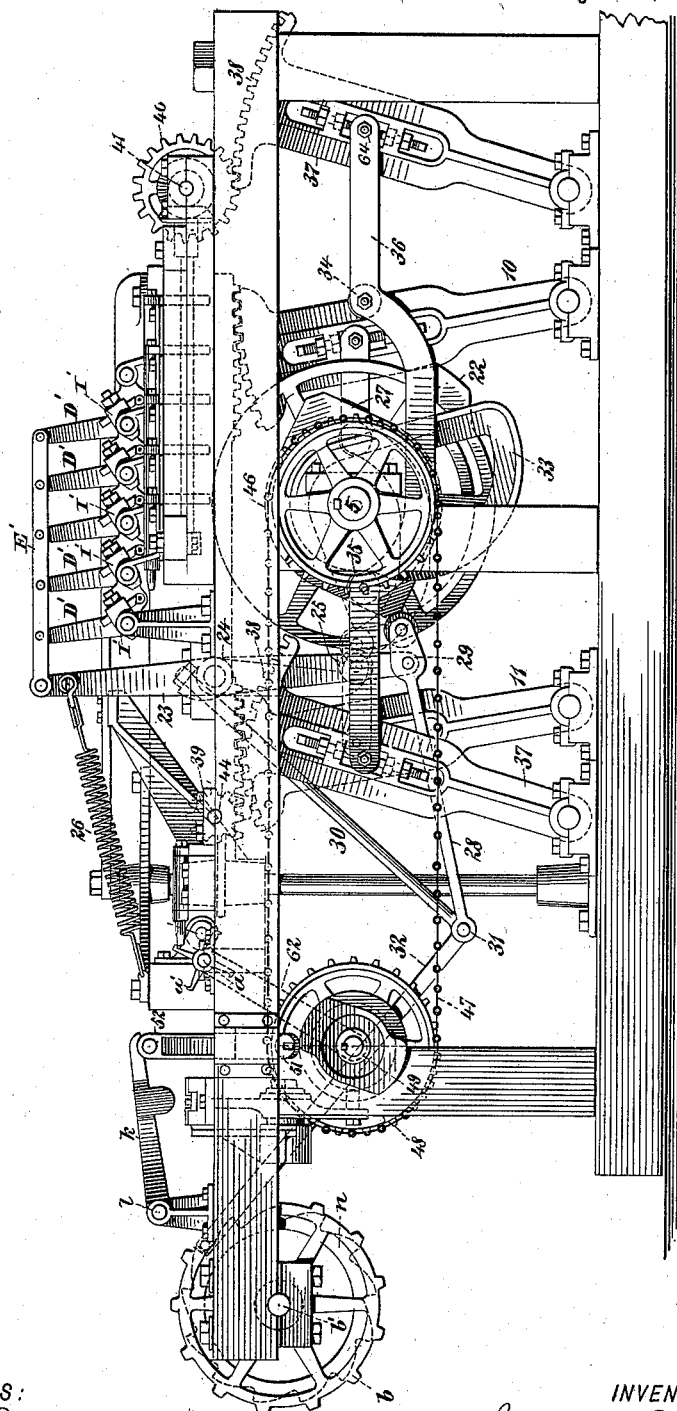
WITNESSES:
Gustave Dieterich
John Kehlenbeck
INVENTORS
John Wood Griswold
Abel G. Goldthwait
BY
Park Benjamin
their ATTORNEY

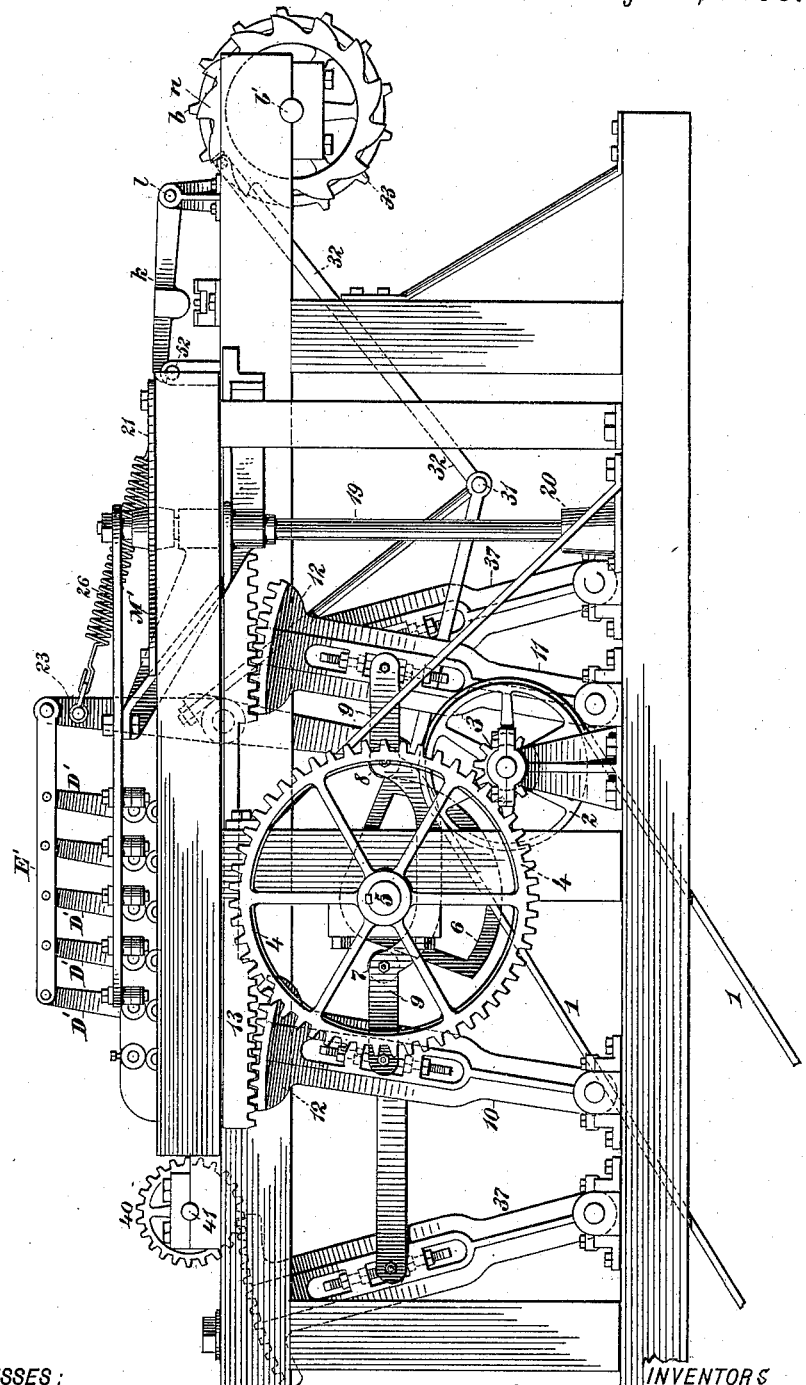

(No Model.) 9 Sheets—Sheet 5.
J. W. GRISWOLD & A. G. GOLDTHWAIT.
MACHINE FOR MAKING WIRE FENCING.
No. 604,041. Patented May 17, 1898.
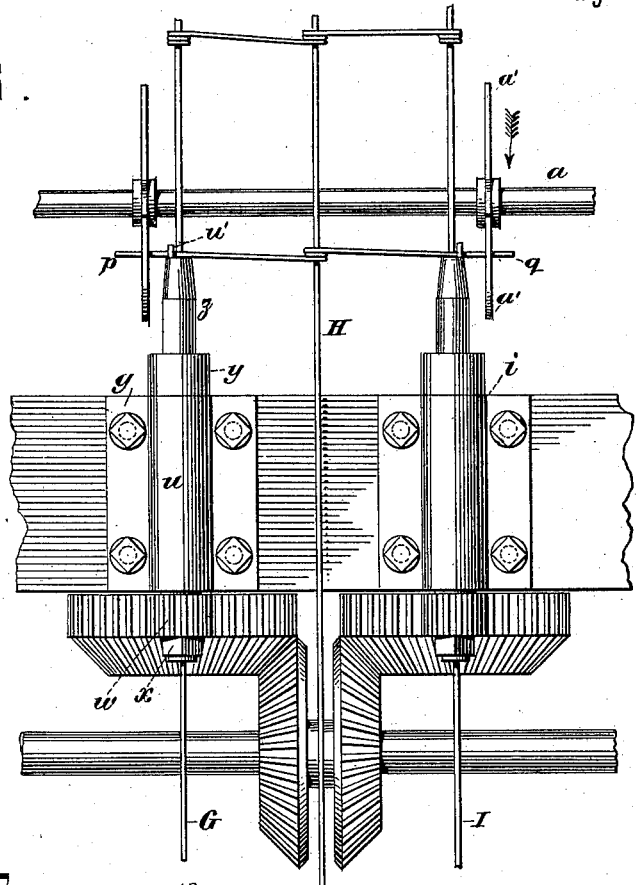
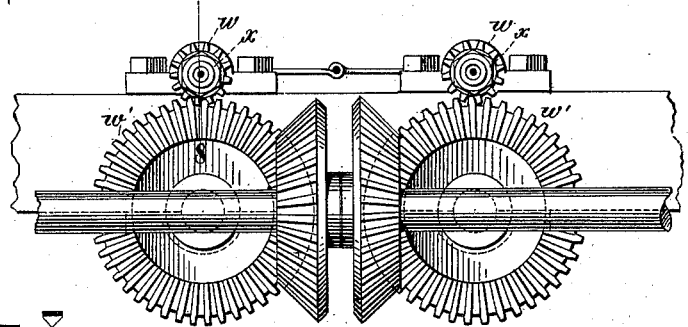
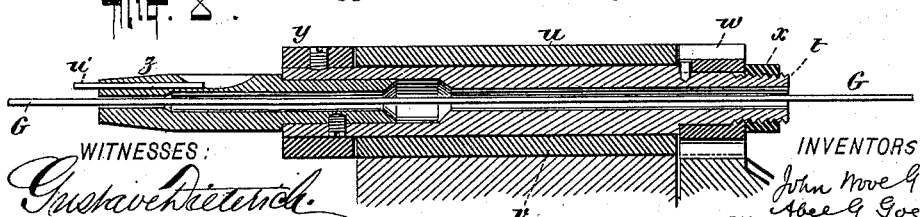

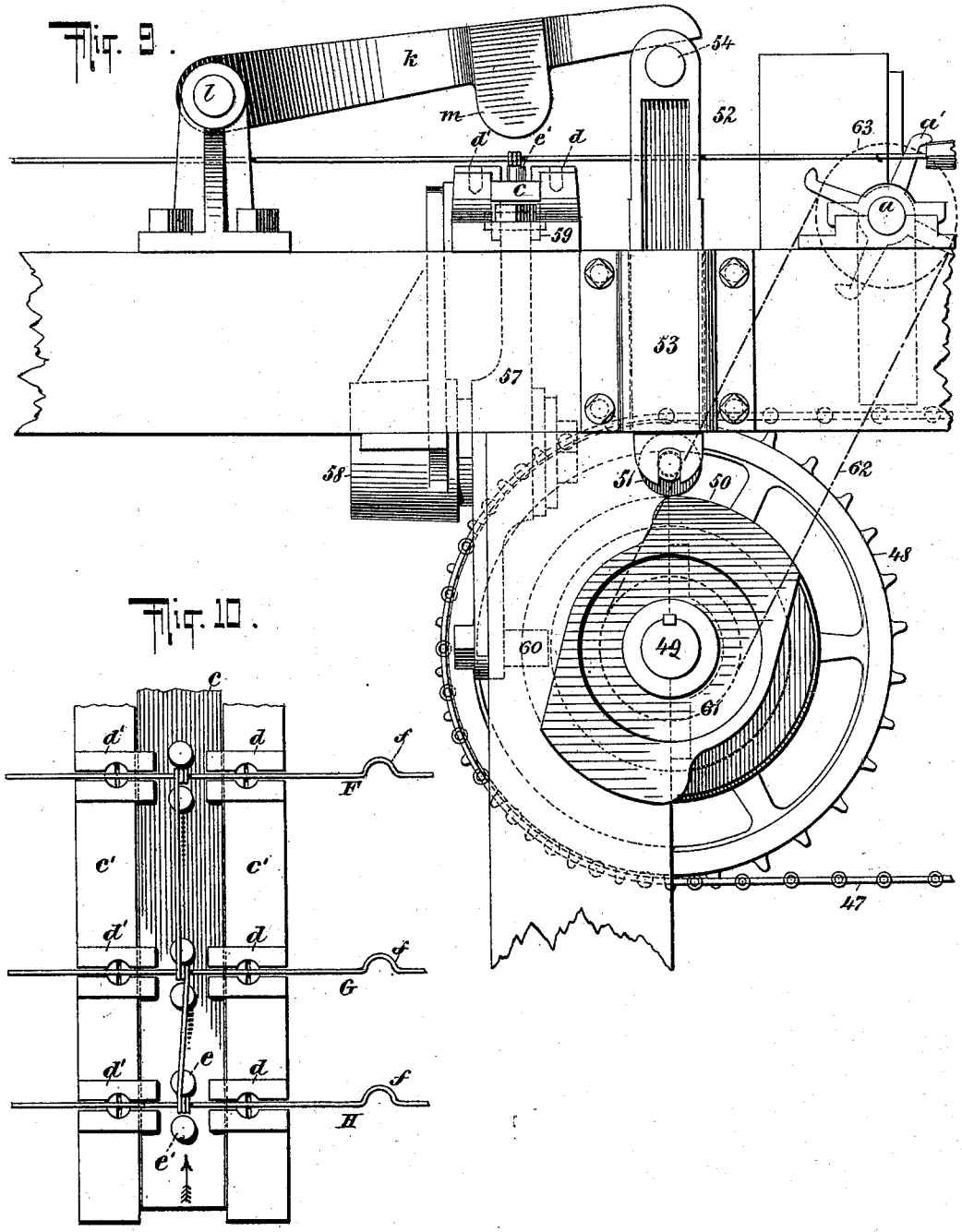

(No Model.) 9 Sheets—Sheet 7.
J. W. GRISWOLD & A. G. GOLDTHWAIT.
MACHINE FOR MAKING WIRE FENCING.
No. 604,041. Patented May 17, 1898.
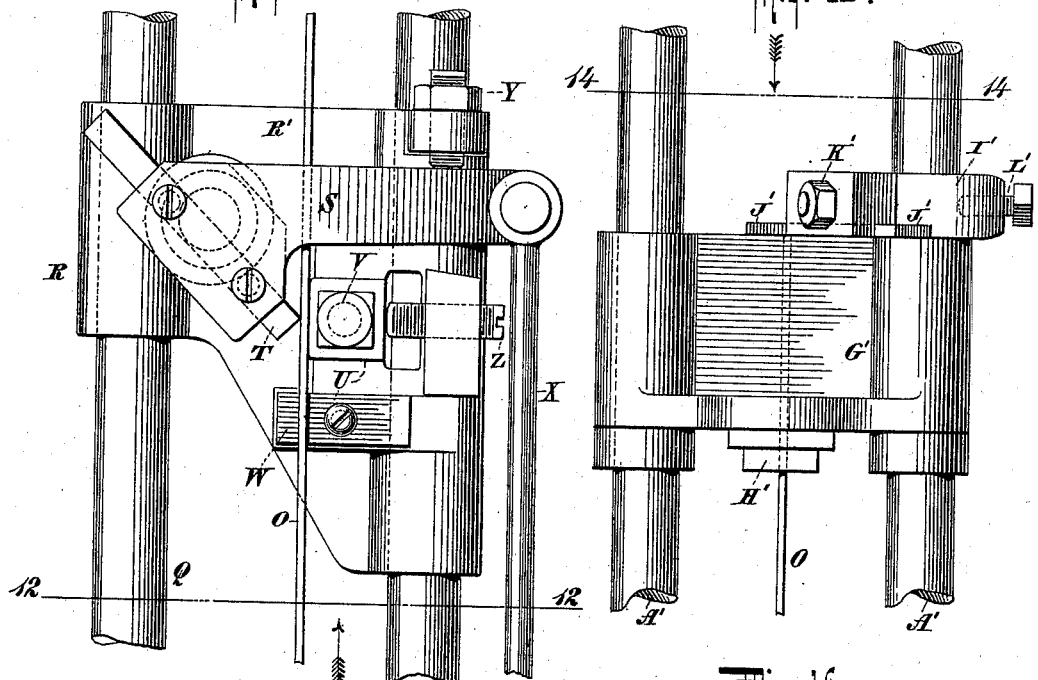
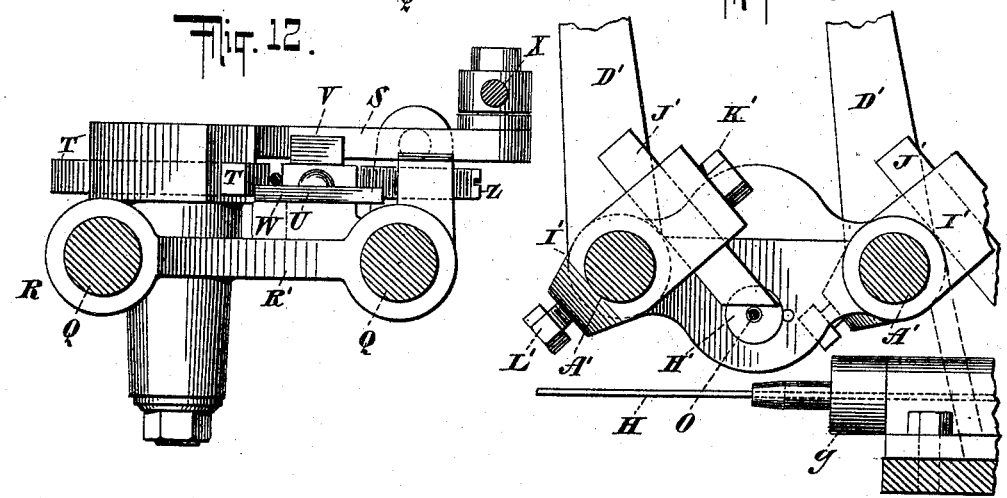
WITNESSES:
Gustave Dietrich.
John Kehlenbeck.
INVENTORS
John Wood Griswold
Abel G. Goldthwait
BY Park Benjamin
Their ATTORNEY.
THE NORRIS PETERS CO., PHOTO-LITHO., WASHINGTON, D. C.

(No Model.) 9 Sheets—Sheet 8.

J. W. GRISWOLD & A. G. GOLDTHWAIT.
MACHINE FOR MAKING WIRE FENCING.

No. 604,041. Patented May 17, 1898.

WITNESSES:
INVENTORS
John Wove Griswold
Abel G. Goedthwait
BY
their ATTORNEY.

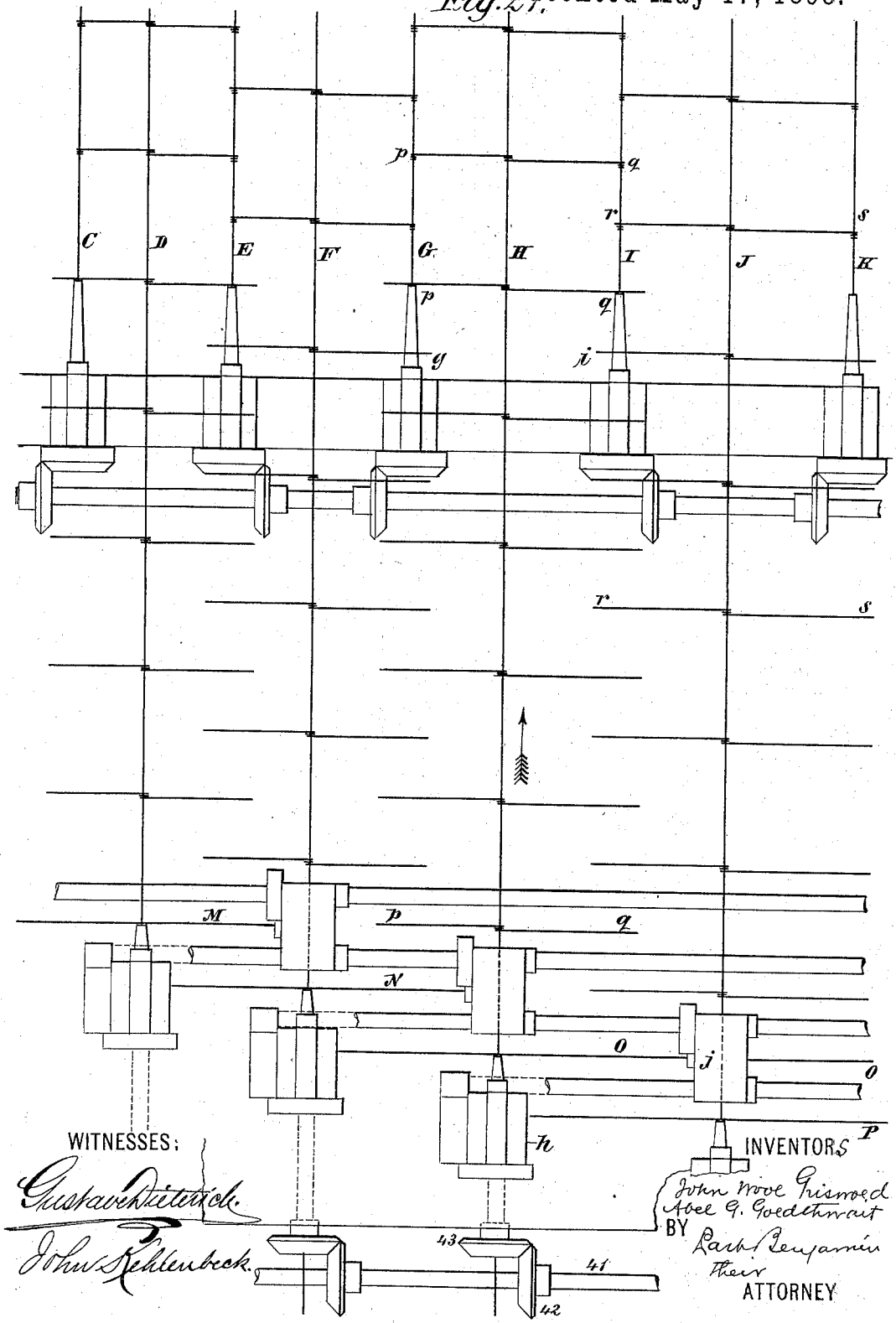

UNITED STATES PATENT OFFICE.

JOHN WOOL GRISWOLD AND ABEL G. GOLDTHWAIT, OF TROY, NEW YORK.

MACHINE FOR MAKING WIRE FENCING.

SPECIFICATION forming part of Letters Patent No. 604,041, dated May 17, 1898.

Application filed November 23, 1897. Serial No. 659,571. (No model.)

*To all whom it may concern:*

Be it known that we, JOHN WOOL GRISWOLD and ABEL G. GOLDTHWAIT, of Troy, Rensselaer county, New York, have invented a new and useful Improvement in Machines for Making Wire Fencing, of which the following is a specification.

Our invention is a machine for making wire fencing of the type disclosed in United States Patent No. 375,345, granted to John Wool Griswold January 19, 1897.

The mode of organization of the machine is as follows: The strand-wires of the fencing are fed into the machine in a longitudinal direction in two series, the wires of one series alternating with those of the other series. The transverse wires are fed at their ends transversely across the strand-wires of the first series and near their ends twisted to said strand-wires. The transverse wires are then cut off, so that each strand-wire has twisted to it a short transverse wire with ends projecting on each side. The first series of strand-wires move forward longitudinally until they reach the second and alternating series of strand-wires, and then the protruding ends of the transverse wire on each strand-wire of the first series are twisted around the adjacent strand-wires of the second series.
The strand-wires may then have crimps or bends formed in them.

The invention consists more particularly in the constructive features and mechanism of the machine and in the combinations thereof, as pointed out in the claims.

Figure 1:
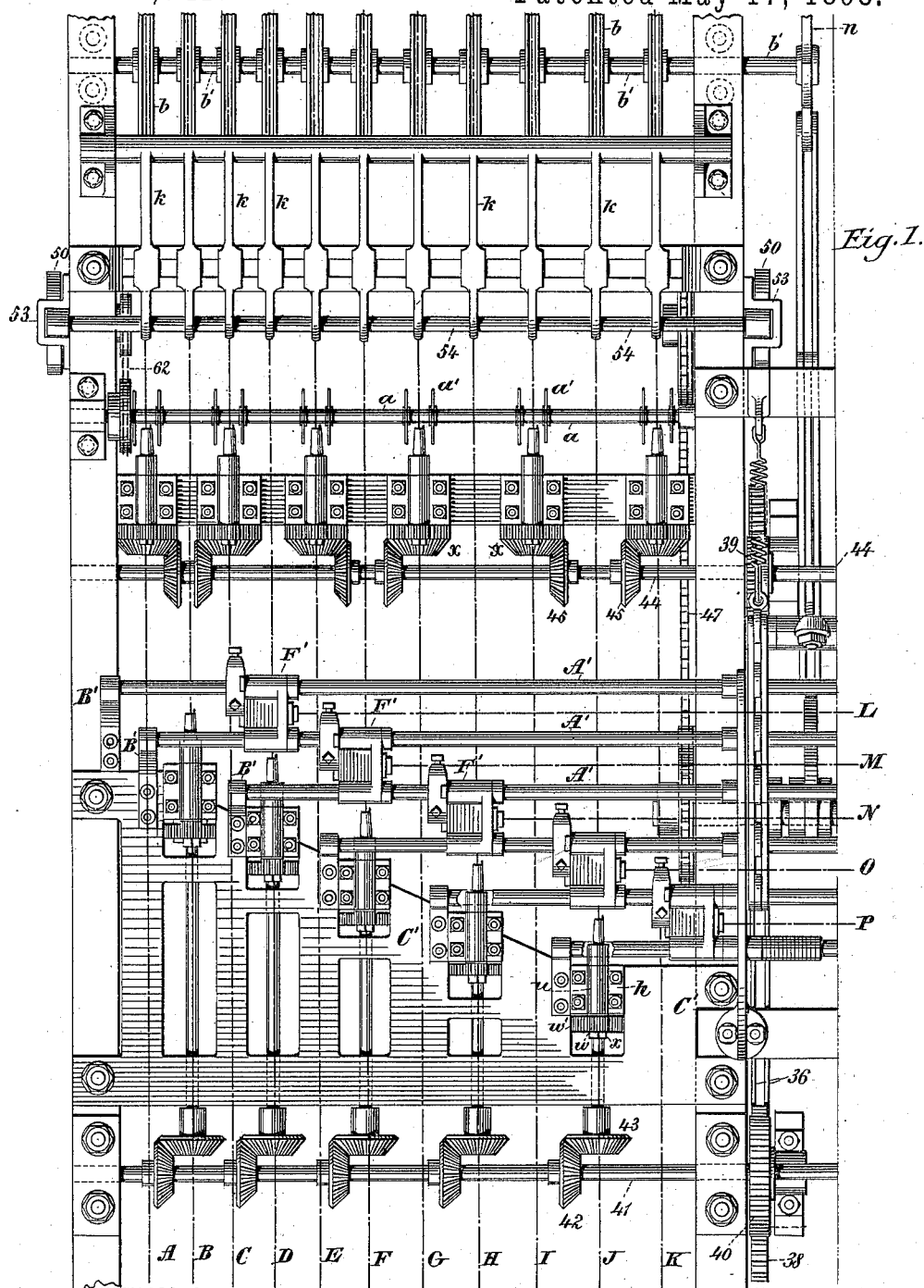
Figure 15:
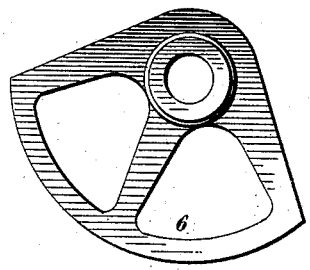
Figure 16:
Figure 17:
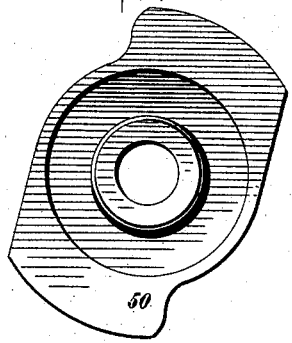
Figure 18:
Figure 19:
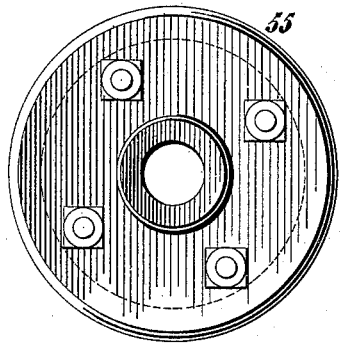
Figure 20:
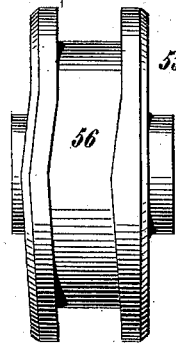
Figure 21:
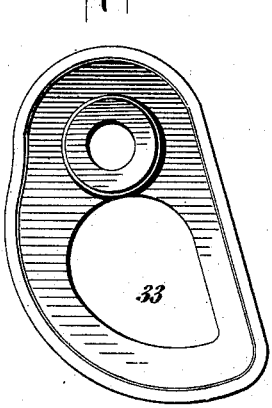
Figure 22:
Figure 23:
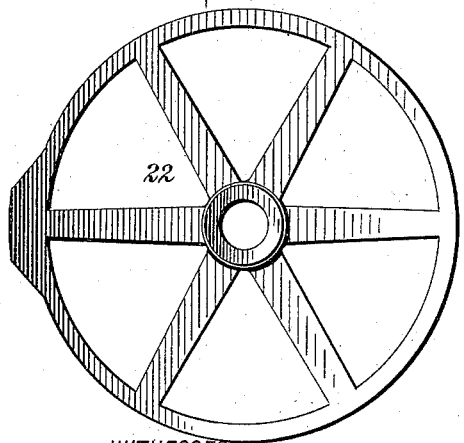
Figure 24:
Figure 25:
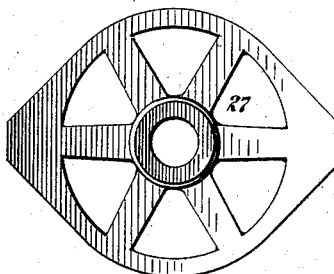
Figure 26:
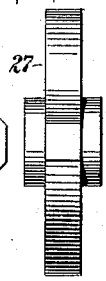

In the accompanying drawings, Figure 1 is a plan view of the machine, showing the device for feeding in the strand-wires and for uniting the cross-wires thereto, but not showing the device for feeding in the cross-wires. Fig. 2 is a similar plan view showing the device for feeding in the cross-wires. Figs. 1 and 2, therefore, when placed together, Fig. 2 being placed on the right of Fig. 1, give an entire plan view of the machine. Fig. 3 is an enlarged detail view of the twisting-heads by which the ends of the cross-wires are twisted around the two adjacent strand-wires. Fig. 4 is a side elevation of the machine, taken from the left-hand side of Fig. 1. Fig. 5 is a side elevation of the machine, taken from the right-hand side of Fig. 2. Fig. 6 is an enlarged detail plan view of the two twisting-heads by which the ends of the cross-wires are twisted around the two strand-wires and also of the gearing and associated parts. Fig. 7 is an elevation of the gearing of Fig. 6. Fig. 8 is a longitudinal section of one of the twisting-heads, taken on the line 8 8 of Fig. 7. Fig. 9 is an enlarged detail side elevation of the crimping device and associated parts and of the device for forcing the wire under the pins of the last series of twisting-heads. Fig. 10 is a plan view of the crimping-bar. Fig. 11 is an enlarged detail view of one of the clamping devices which grip the transverse cross-wires and feed the same into the machine. Fig. 12 is a partial section and side elevation on the line 12 of Fig. 11. Fig. 13 is an enlarged detail plan view of one of the devices for cutting the cross-wires to suitable length. Fig. 14 is a partial section and side elevation on the line 14 of Fig. 13. Figs. 15 and 16 exhibit in plan an edge of the cam which actuates the feeding-in mechanism for the cross-wires. Figs. 17 and 18 are similar views of the cam for actuating the presser-bar which holds the wire down upon the crimping-bar. Figs. 19 and 20 are similar views of the cam which actuates the crimping-bar mechanism. Figs. 21 and 22 are similar views of the cam which actuates the coiling or twisting heads which attach the cross-wires to the strand-wires. Figs. 23 and 24 are similar views of the cam which actuates the cutting-off mechanism for the cross-wires. Figs. 25 and 26 are similar views of the cam which actuates the drawing or feeding-in mechanism for the strand-wires. Fig. 27 is a general diagrammatic view in plan designed to illustrate the general operation of the machine.

Similar letters and numbers of reference indicate like parts.

Referring first to Figs. 1 and 27, A B C D E F G H I J K (dotted lines in Fig. 1) represent the strand-wires, and L M N O P (dotted lines, same figure) represent the cross-wires. The strand-wires A to K are fed forward through the machine. The cross-wires L M N O P are fed transversely from right to left of Fig. 1. In Fig. 27 certain of these wires are shown in full lines. In order to avoid complication, all of them are not represented.

The mode in which the transverse wires are attached to the strand-wires will be best understood from Fig. 27 by considering the attachment of one transverse wire, as O, to three strand-wires, as G H I. The strand-wire H passes through the twisting-heads h and is caused to travel longitudinally by the machine in the direction of the arrow by means hereinafter to be described. The strand-wires G I, immediately adjacent to the strand-wire H, on each side thereof, pass through the twisting-heads g i and are moved by suitable mechanism in the direction of the same arrow and parallel to the strand H.

To avoid complication, in Fig. 27 we do not show as much of the strand-wires G I as extend from the reels of wire to the twisting-heads g i, but only those parts of the strands G I which appear after passing through said twisting-heads.

As will hereinafter be explained, the mechanism for drawing the wires G H I through the machine is located beyond the twisting-heads g i. It will therefore be seen that the three strand-wires G H I are drawn through three twisting-heads g h i simultaneously in the direction of the arrow of Fig. 27 and that these strand-wires are parallel to one another.

Turning now to the transverse wire O, this is fed to the device which unites it to the strand-wire by feeding mechanism (represented in Fig. 2) located on the right-hand side of the machine. The end of the wire after passing through that feeding mechanism is suitably guided, so that it moves across at right angles to the wire H, around which it is twisted by the action of twisting-head h. The cutting device shown in Fig. 27 then operates to divide the transverse wire between the feeding device and the twisting-head. The strand-wire then moves onward with the cut-off transverse piece attached to it and protruding on each side. Such a piece already attached, in the manner described, to the strand-wire H, has its ends marked $p$ $q$ in Fig. 27, and other pieces similarly attached will be seen upon the same strand-wire in advance thereof. The strand-wire H now continues its motion in the direction of the arrow, Fig. 27, until the ends $p$ $q$ are in position to be engaged by the twisting-heads $g$ $i$, and then the twisting-heads operate to twist the ends $p$ $q$ around the adjacent strand-wires G I.

From what has been described, therefore, it will be seen that when the transverse wire is fed into the machine a piece of definite length is twisted around a strand, and thereafter the extremities $p$ $q$ of the protruding ends of that piece are twisted around the two adjacent strands, so that each portion of transverse wire, formed as aforesaid, unites three adjacent strands, as G H I. The action of the machine is such that after a piece of transverse wire has been twisted upon a strand-wire the strand-wire is caused to move forward a definite distance before another piece of transverse wire is presented, twisted, and cut off; but the operation upon other pieces of transverse wire is the same, so that as a consequence the three strand-wires G H I are connected by a series of successive transverse wires equidistantly spaced. Three strands, as G H I, thus united by transverse pieces of wire may be called the "unit" of the fence, which may be made up of as many such units as may be desired. It is to be noted, however, that in connecting such a unit to a second unit, as would be formed of the strands I J K, for example, the strand I is common to both units and that the timing and arrangement of the machine are such that the transverse piece cut from the cross-wire P, the ends of which are represented at $r$ $s$, are so arranged that the ends $r$ are twisted upon the strand I between the ends $q$ of the second successive cross-piece cut from the wire O and united to the same strand; or, to put it another way and more generally, the transverse pieces from the wire P are connected to the strands I J K, so as to alternate with the cross-pieces connected to the strands G H I, and so for every successive pair of units in the fence. It is to secure this that although the transverse wires L M N O P are fed in the machine in a direction parallel to one another the first series of twisting-heads, of which $h$ is a representative, and the first series of cutting devices, of which $j$ is a representative, are disposed diagonally the machine, as represented in Figs. 1 and 27.

The machine as a whole may, broadly, be divided into two parts, the first part including all those devices which directly act upon the wire to feed it, to twist it, to cut it, to present it to the twisting devices, and to crimp it, and the second part the mechanism through which these devices are actuated and which are timed so as to cause the aforesaid devices to operate in proper sequence and at proper intervals.

We will first describe the devices included in what we have designated as the first part of the machine.

*First. The twisting-heads as represented at $g$ $h$ $i$.*—These are of well-known construction and are of the type commonly employed in applying barbs to wire fences. As shown in Fig. 8, each one of them consists of a spindle $t$, which is free to rotate in two-part journals $u$ $v$. Upon one end of the spindle $t$ is secured a pinion $w$ by means of a set-screw and clamping-nut $x$. Upon the other end of the spindle $t$ is a fixed collar $y$. Seated in the spindle $t$ is a head proper, $z$, from the extremity of which protrudes a twisting-pin $u'$. The spindle $t$ and head $z$ are tubular, so that the strand-wire G passes freely through them. The twisting operation will be readily understood from Fig. 3. Here the end of the transverse wire cut from the bar O is bent over between the strand G and the pin $u'$. The twisting-head $z$ is rotated by the large gear $w'$, which engages with the pinion $w$ in the direction of the arrow on the right of Fig. 3, so that the pin $u'$ bends over the end $p$, as shown in dotted lines to the left, and so twists it around the strand G. The twisting device on the left of Fig. 3, which acts on the end $q$, operates in precisely the same way, only in the direction of the reverse arrow, and the action of the twisting-head $h$, which twists the cross-wire at its central portion upon the strand-wire, is also the same as above described.

*Second. The device for carrying the ends $p$ $q$ of a cross-wire under the twisting-pins $u'$ of the twisting-heads $g$ $i$.*—This is best shown in Figs. 6 and 9. It consists of a rotary shaft $a$, projecting from which are four fingers, as $a'$, having bent-over ends, as shown in Fig. 9. After the ends $p$ $q$, Fig. 6, of the transverse cross-piece formed on the wire H reach the ends of the twisting-heads $g$ $i$ they are ready to be twisted upon the parallel strand-wires G I. The shaft $a$ in rotating in the direction of the arrow, Fig. 6, carries the bent-over end of the finger $a'$ upon the end $q$, for example, of the transverse piece, and thus moves that end $q$ downward and rearward and forces it under the pin $u'$ of the twisting-head and closely against the outer end of said head. When this is done, the twisting device $i$ operates, thus getting the extremity $q$ of the cross-piece out of the way of the finger $a'$, which has pushed it into place, so that at the proper time the shaft $a$ is again free to rotate to move the end $q$ of the next succeeding cross-wire into position, as already described.

*Third. The feeding device for strand-wires.*— The several strand-wires A to K, inclusive, are, as already stated, carried through the tubular openings in the twisting-heads, and then after passing over the clamping device, which will be hereinafter explained, are attached to sprocket-wheels $b$, Fig. 1, which are all disposed upon the shaft $b'$, on the end of which shaft is a step-by-step ratchet $n$. This ratchet is rotated in the manner hereinafter to be described, so that all the sprocket-wheels are turned simultaneously, thus drawing the strand-wires through the several twisting-heads.

*Fourth. The crimping device.*—This is best shown in Figs. 9 and 10. It may be divided into two parts—the crimping device proper and the presser for holding the wire down upon the crimping-bar. The crimping device proper (illustrated in Fig. 10) consists in a bar $c$, supported in suitable ways $c'$ transversely the machine and retained therein by the protruding bent-over plates $d$ $d'$. Upon the upper side of the bar $c$ are pairs of pins $e$ $e'$, between which pins the strand-wire H passes. Considering Fig. 10 further, it will be obvious that if the bar $c$ be given longitudinal motion in its ways in the direction of the arrow, the strand-wires meanwhile being stationary, it will produce in said strand-wires crimps or bends, as represented at $f$. These crimps may be produced upon the strand-wire between the points of attachment of the transverse wire or at such points of attachment. In order to hold the wire down between the pins $e$ $e'$, we provide presser-arms $k$, Fig. 9, one for each strand-wire, which presser-arms are pivoted upon a transverse shaft $l$, supported upon the frame of the machine. On the under side of each presser-arm $k$ is a projection $m$, which when the arm $k$ is allowed to descend bears upon the top of the pins $e$ $e'$, and thus retains the wire between said pins and prevents its rising. This presser-arm $k$ is raised and lowered at the proper time by means of a cam mechanism, which will be hereinafter described.

*Fifth. The device for feeding in the transverse wires.*—Upon the frame of the machine, Fig. 2, are six fixed bars Q, disposed parallel. Upon these bars slide gripping devices R, five in number, or, in other words, one for each of the wires L M N O P. Each gripping device slides upon two adjacent bars Q, and the construction of such gripping devices is shown in detail in Figs. 11 and 12. A plate R' is provided with sleeves to receive the parallel fixed bars Q. On the upper side of this plate is pivoted a vibrating arm S, in which is secured by suitable set-screws the inclined gripping-bar T. Also on the face of the plate is a block U, having an oblong opening through which passes a bolt V, by which said block is secured in place. The wire, as O, passes between the gripping-bar T and the block U, and before doing so passes over a steel bed-plate W. The arm S is vibrated by means of the pivoted rod X. The throw of the rod X is limited in one direction by the set-screw Y, by means of which set-screw the extent of throw may be adjusted. The block U is adjustable transversely the plate R' by means of a set-screw Z. The operation of this device upon the wire O is therefore as follows: When the rod X is moved in the direction of the arrow, the wire is first engaged between the clamping-bar T and the block U, and then further motion of the rod X in the same direction causes the plate R' to slide upon the bars Q, thus moving the wire to the left of Fig. 2, and hence into the machine. After a sufficient quantity of wire has been fed the rod X moves in the reverse direction, thus moving the clamping-bar T away from the wire, which wire now remains stationary, the plate R' then sliding in the reverse direction of the arrow in Fig. 11 and beneath said wire. The friction of the wire against the bar is taken by the steel bed-plate W.

*Sixth. The cutting-off device for the transverse wire.*—On referring to Fig. 1 it will be seen that in prolongation of the bars Q are an equal number of rock-shafts A', the right-hand ends of which are journaled below the ends of the bars Q and the left-hand ends of which are received in bearings B', which are disposed diagonally upon the plate C', which is fast upon the framework of the machine.

On each rock-shaft A' is secured a vibrating lever D', Fig. 5, and all these levers D' are pivoted to a horizontal lever E', by vibrating which lever E' the rock-shafts A' may all be simultaneously rocked.

There are as many cutting-off devices of course as there are transverse wires L M N O P, and these cutting-off devices are represented at F' in Fig. 1 and in detail in Figs. 13 and 14. Each device consists of two parts—first, a guide for the wire, and, second, the cutting-tool. The guide for the wire is a plate G', having a sleeve through which the rock-bars A' loosely pass. In the plate G' is a cylindrical plug of metal H', having an aperture through which passes the cross-wire, as O. This plug serves as a guide, and we may provide it with any suitable means (not here shown) for adjusting it for varying the direction of the tubular aperture therein through which the wire passes.

The cutting-tool J' is secured by a clamping-screw K' in the arm I', which is secured fast upon one of the rock-shafts A' by means of the set-screw L'. The operating end of the cutting-tool J' comes just in front of the tubular opening in the plug H'. It will be clear, therefore, that when the arms D' are vibrated to the right of Fig. 14 the rock-shafts A' will all be turned to bring the cutting-tool J' down upon the wires which pass through the plug H', thus cutting said wires, and when the levers D' are moved in the reverse direction the ends of the tool J' will be raised, so as to permit further feeding of wire through the plugs H'.

To recapitulate: The longitudinal or strand wires are drawn through the tubular twisting-heads by means of the sprocket-wheels b, actuated by the step-by-step gear n. The transverse wires L M N O P are intermittently moved into the machine and in proper position over the strand-wires by means of the clamping feeding devices R, which are actuated by the rod X, all of which rods are pivoted to a single vibrating lever M', Figs. 2 and 5, and said transverse wires are twisted near their ends around every alternate strand, as B D F H J. The cutting off of the wires L M N O P to proper length is effected by the cutting devices F', which are carried upon the rock-shafts A', which rock-shafts are actuated by the levers D', all connected to the single lever E'. These strands carrying the cross-pieces are moved forward, and the ends p q of the cross-pieces are then by the twisting devices g i, &c., twisted about the strands A C E G I K, the cross-pieces being placed in the finished fence in alternate or staggered relation. The fencing is now practically completed. Further crimping operation may or may not be employed, as desired. It is not essential to the manufacture of the fencing, nor is the mechanism performing it essential in our present machine; but as we think that it is in some cases desirable to provide such a fence as this with crimps we have shown in conjunction with this machine a crimping device. It will be seen, therefore, that after the wires, strand and transverse, have been put together as we have described the strand-wires pass between the pins e e' of the crimping contrivance, and while held therein by the presser-bar k they are crimped, as shown at f, by longitudinal motion of the crimping-bar c.

We will now describe the second part of the machine—namely, the mechanism by which all of the various portions above described are operated in proper time and relation.

Referring first to Fig. 5, which, as already stated, is an elevation of the machine, taken from the right-hand side of Fig. 2, power is communicated from the belt 1 and the driving-pulley 2, on the shaft of which pulley is a pinion 3, which engages with the large gear-wheel 4. This gear-wheel 4 is on the main shaft 5 of the machine, and from this shaft 5 the principal devices already enumerated are, by means of the cams which are placed in successive order upon that shaft, operated. We shall take each of these cams in turn and point out what mechanism it operates.

The cam 6 (shown in Figs. 15 and 16) actuates the mechanism for feeding in the transverse or cross wires L M N O P, and as it revolves it bears upon rollers 7 and 8, journaled in a bar 9, the ends of which bar are pivoted to the vibrating arms 10 and 11. These arms are pivoted to the base of the machine, and inasmuch as they are connected together by the bar 9 they are vibrated on their pivots in unison. The upper ends 12 of the bars 10 and 11 are toothed sectors which engage with the teeth on the under side of the sliding rack-bar 13, Figs. 2 and 5. The bar 13 slides underneath fixed rollers 14, journaled upon the frame, and bears on one side against the rollers, one of which is shown at 14, Fig. 2, also journaled in fixed bearings in the frame. On the opposite side of the bar 13 to that which bears against the rollers 15 is a rack-bar 16, with which engages a horizontal toothed sector 17, which is on the end of a lever 18, which lever is fast upon a vertical rock-shaft 19. The vertical shaft 21 is journaled in a diagonal piece extending across the corner of the frame, as shown in Fig. 2, at its upper end, and its lower end is in a set bearing 20, Fig. 5. Fast upon the upper end of rock-shaft 19 is a bar M', which, as already explained, actuates the rod X of the transverse clamping and feeding devices. It will be seen, therefore, that the cam 6 in revolving acts upon the rollers 7 and 8, thus giving the bar 9 a longitudinal to-and-fro movement. The bar 9 causes the vibration of arms 12, the teeth of which engage with the rack-teeth on the under side of the bar 13, thus giving to that bar a to-and-fro longitudinal motion. Motion is imparted from the bar 13 by the rack-teeth 16 to the toothed sector 17 and so to arm 18 and shaft 19, and thus the lever M' is also caused to vibrate to and fro on its pivot, thus simultaneously actuating all of the clamping devices R through the rods X to cause them to operate to feed the transverse wires L M N O P in the manner already previously described.

The second cam on shaft 5 is shown at 22, Fig. 4, and also in Figs. 23 and 24. The function of this cam is to operate the cutting-off devices F' for the transverse wires. In rotating it bears against a roller 25, (dotted lines, Fig. 4,) carried on the lower end of the lever 23, which is pivoted to the frame at 24 and so vibrates said lever 23. The upper end of lever 23 is pivoted to the bar E, which, as already stated, is pivoted to the arms D', which operate the cutting-off devices in the manner already described. A spiral retracting-spring 26 is secured to lever 23 and the frame and operates to cause said lever, and hence arms D', to move in opposite direction to that in which they are moved by the cam.

The third cam on shaft 5 is shown at 27, Fig. 4, and in Figs. 25 and 26. This cam in rotating bears against a roller carried on the end of arm 28, Fig. 4, which arm is pivoted just inside the roller to an arm 29, which is also pivoted to the frame at the point 24, and to the upper end of arm 29 is secured a rod 30. The lower end of this rod is pivoted to the opposite end of rod 28 at 31. It will be seen, therefore, that arm 28, arm 29, and rod 30 form a triangular frame which is free to vibrate on the pivot 24 when acted upon by the cam 27 as the latter rotates. Also at the ends of rods 30 and 28, at their meeting-point 31, is pivoted a long pawl 32, which engages with the teeth of the ratchet-wheel $n$.

Referring now to Fig. 4, whenever during revolution of the cam 27 a projection on that cam meets the roller at the end of rod 28 it causes the triangular frame 28 29 30 to swing to the left of Fig. 4, and thus moves the pawl 32 bodily to cause its point to take against one of the teeth of the ratchet-wheel $n$ and advance that tooth forward, or to the left of Fig. 4, a distance equal to the throw of the pawl. When the cam is no longer acting, the frame 30 28 29 swings back, and the pawl 32 slides over the inclined side of the next tooth and over the point of the tooth and so engages with its rear side ready to act on that tooth on the next passage of the cam. In this way the sprocket-wheels $b$ (which unitedly form a winding-drum upon which the completed fencing is wound) on the shaft $b'$, Fig. 1, are simultaneously rotated to draw the wires A to K, inclusive, through the machine.

The fourth cam on shaft 5 is shown at 33 in Fig. 4 and also in Figs. 21 and 22. This cam in rotating bears against two rollers, one of which is shown at 34 and the other at 35, Fig. 4. These rollers are pivoted at the angles of a bent connecting-bar 36. The extremities of this bar are pivoted to vibrating arms 37, which arms are pivoted, like arms 10 and 11, to the bottom of the main frame. At the upper ends of arms 37 are toothed sectors 38, and these sectors 38 engage with pinions 39 and 40. Pinion 40 is on the end of shaft 41, Fig. 1, which shaft communicates by beveled pinions 42 with beveled pinions 43 on the ends of the spindles of the twisting-heads $h$. Pinion 39 is on the end of a shaft 44, Fig. 1, which carries beveled pinions 45, which pinions engage with the pinions $x$ on the spindles of the twisting-heads $g$ $i$, &c. It will be seen, therefore, that as the arms 37 are vibrated through the rod 36 by the action of cam 33 the toothed sectors engaging with pinions 39 and 40 rotate simultaneously both series of twisting-heads, (represented by twisting-heads $h$ and twisting-heads $g$ $i$.)

To recapitulate, therefore, there are four cams successively placed on the main shaft 5. Cam 6 actuates the feeding devices for the transverse wires L M N O P. Cam 22 actuates the cutting-off devices F' for these same wires. Cam 27 operates the pawl and ratchet which rotates the wheels $b$ and so draws the strand-wires A to K, inclusive, through the machine. Cam 33 rotates the twisting-heads. As the transverse wires are twisted around the strand-wires before they are cut off the object of the long concentric arc on the cam, Figs. 15 and 16, is to hold the grip on the transverse wire until the twisting is completed. The grip is intended to hold the wire from slipping in both directions, and the clamping-bar T, Fig. 11, is therefore made with a square end and set at an angle of forty-five degrees.

We now come to the mechanism for actuating the crimping devices. In the inner end of shaft 5 is a sprocket-wheel 46, which by means of a chain belt 47 communicates motion to the sprocket-wheel 48, Fig. 9. At the end of shaft 49 of the sprocket-wheel 48 are similar cams 50, which bear upon rollers 51, located at the ends of vertical sliding pieces 52. These pieces slide in ways 53 in the frame. Extending between the ends of the vertical sliding pieces 52 is a bar 53, which extends across the machine, as shown in Fig. 1. The bar 54 is a lifting-bar, and all the pressing-levers $k$ bear upon it, as shown in Fig. 9. It follows, therefore, that as the shaft 49 is rotated the bars 52 are raised and lowered alternately, thus raising and lowering the presser-bars $k$ upon the wire beneath them. One of the cams 50 is also shown in Figs. 17 and 18. Also upon the shaft 49 is a disk 55, having a cam-groove 56, Fig. 20, on its periphery.

Referring now to Fig. 9, 57 is a vibrating lever pivoted to the frame at 58. One end of this lever is keyed at 59 to the sliding crimping-bar $c$. The other end of it carries a pin 60, which enters the cam-groove 56. Therefore as the cam-disk 55 is rotated by shaft 49 the bar 57 is vibrated, and the crimping-bar $c$ is moved to and fro longitudinally in its ways in the manner already described. Also on the shaft 49 is a pulley 61, (dotted lines, Fig. 9,) which, by the belt 62, communicates with a pulley 63 on the shaft *a*. In this way the shaft *a* is rotated and the fingers *a'* on that shaft are caused to push the transverse wires under the twisting-pins of the twisting-heads, as already described. The ends of the bar 36, also the ends of bar 9, are connected to the vibrating arms 10, 11, and 37 adjustably, so that they may be raised or lowered in said bars by means of set-screws, as represented at 64 on the right of Fig. 4.

The relation of the several parts above described and of the gearing is to be such that the operation of the several mechanisms is timed to produce the general results already described, so that the machine as a whole turns out a wire fence consisting of longitudinal strands of wire with cross-pieces, also of wire, secured to said strands by twisting and arranged substantially as illustrated.

We claim—

1. In a wire-fence-making machine, mechanism for moving three strand-wires in a longitudinal direction, mechanism for moving a transverse wire in a longitudinal direction across said strand-wires, mechanism for securing said transverse wire between its ends to the middle strand-wire, and mechanism for securing the ends of said transverse wire respectively to the other strand-wires, substantially as described.

2. In a wire-fence-making machine, mechanism for moving five strand-wires G, H, I, J, K in a longitudinal direction, mechanism for moving a transverse wire in a longitudinal direction across the strand-wires G, H, I, mechanism for moving a second transverse wire in a longitudinal direction across the strand-wires I, J, K, mechanism for securing said first transverse wire between its ends to the strand-wire H, mechanism for securing the ends *p*, *q* of said transverse wire to the strand-wires G, I, mechanism for securing said second transverse wire between the ends of the strand-wire J and mechanism for securing the ends *r*, *s* of said second transverse wire I, K, substantially as described.

3. In a wire-fence-making machine, mechanism for moving three strand-wires in a longitudinal direction, mechanism for moving a transverse wire in a longitudinal direction across said strand-wires, mechanism for cutting said transverse wire to definite length, mechanism for securing said divided piece of transverse wire between its ends to the middle strand-wire, and mechanism for securing the ends of said divided piece of transverse wire respectively to the other strand-wires, substantially as described.

4. In a wire-fence-making machine, mechanism for moving three strand-wires in a longitudinal direction, mechanism for moving a transverse wire in a longitudinal direction across said strand-wires, mechanism for twisting the body portion of said transverse wire around the middle strand-wire, and mechanism for twisting the ends of said transverse wire respectively around the other strand-wires, substantially as described.

5. In a wire-fence-making machine, mechanism for moving three strand-wires H, I, J in a longitudinal direction, the said strand-wires H, J being provided with transverse wires secured to them and having ends *r*, *q*, alternately crossing the middle strand-wire I, and mechanism for securing said ends to said strand-wire I, substantially as described.

6. In a wire-fence-making machine, mechanism for moving three strand-wires H, I, J in a longitudinal direction, mechanism for moving transverse wires alternately across the wires H, I, and I, J, mechanism for securing said transverse wires between their ends to the wires H, J and mechanism for securing the ends *r*, *q* of said wires alternately to the strand-wire I, substantially as described.

7. In a wire-fence-making machine, mechanism for feeding a series of strand-wires, mechanism for feeding a series of parallel transverse wires in a plane parallel to that of said strand-wires, mechanism for cutting the transverse wires, and mechanism for securing each section of transverse wire between its ends to one of said strand-wires, substantially as described.

8. In a wire-fence-making machine mechanism for feeding a series of strand-wires, mechanism for feeding a series of parallel transverse wires in a plane parallel to that of said strand-wires, mechanism for cutting the transverse wires, and mechanism for winding each section of transverse wire around one of said strand-wires, substantially as described.

9. In a wire-fence-making machine, mechanism for feeding a series of parallel strand-wires, mechanism for feeding a series of parallel transverse wires in a plane parallel to that of said strand-wires, whereby each strand-wire is overlapped by a transverse wire for a determinate distance, mechanism for cutting the transverse wire, and mechanism for securing each section of transverse wire between its ends to one of said strand-wires, substantially as described.

10. The combination in a wire-fence-making machine, of three twisting devices *g*, *h*, *i*, mechanism for moving three strand-wires through said twisting devices, a feeding mechanism operating to move a transverse wire O across said strand-wires, and a cutting device for said strand-wire; the aforesaid parts being constructed and timed so that after said transverse wire shall have been moved across the middle strand-wire by the said feeding mechanism, the twisting devices *h* shall twist said divided piece of transverse wire between the ends upon the middle strand-wire, the said cutting device shall then operate to cut it to definite length, and thereafter the twisting devices *g*, *i* shall twist the ends *p*, *q* of said divided piece of transverse wire respectively upon the other strand-wires, substantially as described.

11. The combination in a wire-fence-making machine of mechanism for moving three strand-wires H, I, J in a longitudinal direction, the said strand-wires H, J being provided with transverse wires secured to them and having ends $r$, $q$ alternately crossing the middle strand-wire I, and a twisting device through which said strand-wire I passes; the said twisting device operating upon the ends $r$, $q$ to twist said ends around said wire I, substantially as described.

12. The combination in a wire-fence-making machine, with mechanism for moving a series of strand-wires in a longitudinal direction, of twisting devices $h$ disposed in series diagonally with reference to the line of movement of said wires, through which twisting devices said wires move, mechanism for feeding a series of transverse wires simultaneously across said strand-wires and to said twisting devices, and a series of cutting devices disposed diagonally and similarly to said twisting devices and acting upon said transverse wires respectively; the aforesaid parts being constructed and timed so that a transverse wire shall be fed simultaneously over each strand-wire, then twisted at its middle around said strand-wire, and then cut to definite length by a cutting device, substantially as described.

13. The combination in a wire-fence-making machine with mechanism for moving two series of strand-wires simultaneously in a longitudinal direction; the wires of one series as D, F, H, J alternating with the wires of the other series, as E, G, I, of twisting devices as $h$ disposed in series diagonally with reference to the direction of movement of said wires, through which twisting devices said wires D, F, H, J pass, a second series of twisting devices, as $g$, staggered in position with reference to said first series, through which second series said wires E, G, I, pass, mechanism for feeding a series of transverse wires simultaneously across said strand-wires D, F, H, J and to said first series of twisting devices and a series of cutting devices disposed diagonally and similarly to said first series of twisting devices and acting upon said transverse wires respectively; the aforesaid parts being constructed and timed so that a transverse wire shall be fed simultaneously over each strand-wire D, F, H, J, then twisted at its middle by a twisting device as $h$ around its associate strand-wire, then cut to definite length by a cutting device, and then carried onward by said strand-wire until its ends meet two twisting devices as $g$, $i$, of the second series whereby its said ends $p$, $q$ are twisted around the adjacent strand-wires G, I, substantially as described.

14. In a machine for making wire fencing having longitudinal or strand wires and transverse wires uniting said strand-wires mechanism for producing short bends laterally projecting from said strand-wires at the junctions of said strand-wires and said transverse wires, substantially as described.

15. In a machine for making wire fencing, a plurality of twisting devices through which the strand-wires of the fence are fed, mechanism for simultaneously feeding the transverse wires to said twisting devices, mechanism for cutting said transverse wires into lengths to extend from the strand-wires whereon they are twisted to adjacent strand-wires, and mechanism for producing crimps or bends in the strand-wires at the junction of said strand and transverse wires, substantially as described.

16. In a wire-fence-making machine, mechanism for moving two strand-wires in a longitudinal direction, one of said wires being provided with a transverse wire projecting across said other strand-wire, a twisting device through which said second strand-wire passes, and operating to twist said transverse wire at one end about said second strand, and means for forcing the end of said transverse wire into close engagement with said twisting device, substantially as described.

17. The combination of a twisting-head having a rotary spindle $t$ and pin $u'$ with the rotary shaft $a$ having finger $a'$, substantially as described.

18. The combination in a wire-crimping device of a bar $c$, having pairs of pins as $e$, $e'$ adapted to receive between them the wire to be crimped, means for holding said wire between said pins, and mechanism for moving said bar in a direction transverse said wire, substantially as described.

19. The combination in a wire-crimping device of the bar $c$ having pairs of pins as $e$, $e'$, adapted to receive between them the wire to be crimped, means for holding said wire in tense condition between said pins, a presser-bar for said wire and mechanism for moving said bar $c$ in a direction transverse said wire, substantially as described.

20. The combination in a multiple wire-crimping device of a bar $c$ having as many pairs of pins $e$, $e'$ as there are wires to be crimped, and adapted to receive said wires between them, means for holding said wires parallel and in tense condition, and mechanism for moving said bar transversely the direction of said wires, substantially as described.

21. The combination in a multiple wire-crimping machine of a bar $c$, having as many pairs of pins $e$, $e'$ as there are wires to be crimped, and adapted to receive said wires between them, means for holding said wires parallel and in tense condition, a series of presser-bars acting upon said wires, mechanism for simultaneously operating said presser-bars, and mechanism for moving said bar $c$ transversely the direction of said wires, substantially as described.

22. The combination in a wire-crimping machine of the bar $c$, having pins $e$, $e'$, ways $c'$ in which said bar *c* slides longitudinally, rotary shaft 49, cam-disk 55 thereon, vibrating lever 57 actuating bar *c* and having pin 60 entering the groove of said cam-disk, substantially as described.

23. The combination in a wire-crimping device of the bar *c* having pins *e*, *e'*, ways *c'* in which said bar *c* slides longitudinally, rotary shaft 49, cam-disk 55 thereon, vibrating lever 57 actuating bar *c* and having pin 60 entering the groove in said cam-disk 55, pivoted presser *k*, lifting-bar 54, support-bar 52 therefor, and cam 50 on shaft 49 actuating said support-bar 52, substantially as described.

24. In a wire-fence-making machine, a plurality of twisting devices through which the strand-wires of the fence are fed, mechanism for simultaneously feeding the transverse wires to said twisting devices and mechanism for cutting said transverse wires into lengths to extend from each side of the strand-wires whereon they are respectively twisted to the adjacent strand-wires, substantially as described.

25. In a wire-fence-making machine a plurality of twisting devices through which the strand-wires of the fence are fed, mechanism for simultaneously feeding the transverse wires to said twisting devices, mechanism for cutting said transverse wires into lengths to extend from each side of the strand-wires whereon they are respectively twisted to adjacent strand-wires, a winding-drum whereon said strand-wires are wound, and mechanism for actuating said drum, substantially as described.

26. In a wire-fence-making machine, the combination of the rotary shaft 5, cam 6, bar 9, actuating said cam, vibrating arms 10 and 11 actuated by said bar and carrying sectors 12, rack-bar 13 engaging with said sectors, rack-bar 16 carried by bar 13, lever 18 having sector 17 engaging with bar 16, rock-shaft 21 and wire-feeding devices actuated from said rock-shaft, substantially as described.

27. In a wire-fence-making machine, the combination of the rotary shaft 5, cam 27 thereon, pivoted arm 28, arm 29, rod 30, pawl 32, ratchet-wheel *n* actuated by said pawl, and a wire-feeding device actuated from said ratchet-wheel, substantially as described.

28. In a wire-fence-making machine the combination of the rotary shaft 5, cam 33 thereon, bar 36 actuated by said cam, pivoted arms 37 carrying sectors 28, gears actuated by said sectors and wire-twisting devices actuated from said gears, substantially as described.

JOHN WOOL GRISWOLD.
ABEL G. GOLDTHWAIT.

Witnesses:
W. C. D. WILLSON,
ANNIE L. COFFEY.